(12) United States Patent
Kim et al.

(10) Patent No.: US 11,025,122 B2
(45) Date of Patent: Jun. 1, 2021

(54) FAN MOTOR

(71) Applicant: LG ELECTRONICS INC., Seoul (KR)

(72) Inventors: Taekyung Kim, Seoul (KR); Sungbae Song, Seoul (KR); Younggyu Jung, Seoul (KR); Joongkeun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 16/482,304

(22) PCT Filed: Feb. 1, 2018

(86) PCT No.: PCT/KR2018/001410
§ 371 (c)(1),
(2) Date: Jul. 31, 2019

(87) PCT Pub. No.: WO2018/143705
PCT Pub. Date: Aug. 9, 2018

(65) Prior Publication Data
US 2020/0006997 A1   Jan. 2, 2020

(30) Foreign Application Priority Data

Feb. 1, 2017   (KR) .................. 10-2017-0014465

(51) Int. Cl.
*H02K 5/04*   (2006.01)
*H02K 5/20*   (2006.01)
(Continued)

(52) U.S. Cl.
CPC ............. *H02K 5/04* (2013.01); *B23Q 11/127* (2013.01); *H02K 5/20* (2013.01); *H02K 7/14* (2013.01); *H02K 9/06* (2013.01); *A47L 5/22* (2013.01)

(58) Field of Classification Search
CPC .......... H02K 9/06; H02K 5/04; F04B 17/048; F04D 17/10; F04D 29/582; A47L 5/22; A47L 5/28
See application file for complete search history.

(56) References Cited

U.S. PATENT DOCUMENTS 3,243,102 A  *  3/1966  Mcmahan ............. F04D 29/441
                                                            415/208.2
5,385,447 A  *  1/1995  Geister ..................... F04D 1/04
                                                            415/220
(Continued)

FOREIGN PATENT DOCUMENTS

DE       3038298   *  5/1982   ............... A47L 5/22
DE       8704717       2/1988
(Continued)

OTHER PUBLICATIONS

International Search Report (with English Translation) and Written Opinion dated Jun. 5, 2018 issued in Application No. PCT/KR2018/001410.
(Continued)

*Primary Examiner* — Burton S Mullins
(74) *Attorney, Agent, or Firm* — Ked & Associates LLP (57) ABSTRACT

A fan motor is provided that includes an inner housing having an inner space formed therein; a rotational shaft assembly supported in the inner housing and having a rotor and a bearing mounted on a rotational shaft thereof; a stator disposed to surround the rotor in the inner housing; an impeller connected to the rotational shaft; and an outer housing that surrounds an outer periphery of the inner housing and having an inlet body that guides air to the impeller. At least one heat dissipation vane is provided on an outer peripheral surface of the inner housing to guide air which passes between the inner housing and the outer housing after being suctioned into the inlet body, and thus, (Continued)

when being guided by the at least one heat dissipation vane, the air having been moved by the impeller may efficiently absorb heat transferred from the stator to the at least one heat dissipation vane and more stably flow than when colliding against the stator and the rotor, and thus, may be quickly discharged.

19 Claims, 6 Drawing Sheets

(51) Int. Cl.
    *H02K 9/06*     (2006.01)
    *B23Q 11/12*     (2006.01)
    *A47L 5/22*     (2006.01)
    *F04D 17/04*     (2006.01)
    *H02K 7/14*     (2006.01)

(56) References Cited

U.S. PATENT DOCUMENTS

| | | | | |
|---|---|---|---|---|
| 5,494,418 | A * | 2/1996 | Moriya | F04D 29/167 |
| | | | | 417/423.14 |
| 5,743,710 | A * | 4/1998 | Yapp | F04D 17/165 |
| | | | | 415/208.2 |
| 6,129,524 | A * | 10/2000 | Woollenweber | F04D 17/12 |
| | | | | 417/366 |
| 7,629,717 | B2 * | 12/2009 | Kanei | H02K 9/08 |
| | | | | 310/64 |
| 7,800,263 | B2 * | 9/2010 | Horng | H02K 1/185 |
| | | | | 310/67 R |
| 9,404,502 | B2 * | 8/2016 | Ishikawa | F04D 29/162 |
| 10,098,515 | B2 * | 10/2018 | Park | F04D 29/444 |
| 2013/0129488 | A1 | 5/2013 | Agrawal et al. | |
| 2014/0158131 | A1 * | 6/2014 | Kenyon | A61M 16/0858 |
| | | | | 128/204.18 |
| 2017/0363024 | A1 * | 12/2017 | Sivaraman | H02K 9/06 |
| 2018/0066666 | A1 * | 3/2018 | Colson | F04D 29/181 |
| 2018/0100517 | A1 * | 4/2018 | Sawada | F04D 29/464 |
| 2018/0156233 | A1 * | 6/2018 | Sawada | F04D 29/44 |
| 2018/0252238 | A1 * | 9/2018 | Hwang | F04D 29/667 |

FOREIGN PATENT DOCUMENTS

| | | | |
|---|---|---|---|
| EP | 3015713 A1 * | 4/2016 | ............. F04D 17/16 |
| JP | 11-275812 | 10/1999 | |
| JP | 2008-067552 | 3/2008 | |
| JP | 2010-281232 | 12/2010 | |
| KR | 20-1998-013743 | 6/1998 | |
| KR | 10-2003-0049640 | 6/2003 | |
| KR | 10-2011-0111282 | 10/2011 | |
| WO | WO 94/17306 | 8/1994 | |
| WO | WO 2016/194697 | 12/2016 | |

OTHER PUBLICATIONS

European Search Report dated Oct. 26, 2020 issued in Application No. 18747879.7.

* cited by examiner

FAN MOTOR

CROSS-REFERENCE TO RELATED PATENT APPLICATIONS

This application is a U.S. National Stage Application under 35 U.S.C. § 371 of PCT Application No. PCT/KR2018/001410, filed Feb. 1, 2018, which claims priority to Korean Patent Application No. 10-2017-0014465, filed Feb. 1, 2017.

TECHNICAL FIELD

The present disclosure relates to a fan motor, and more particularly, to a fan motor with a rotor and a stator.

BACKGROUND

The fan motor may be installed in a home appliance such as a vacuum cleaner, an air conditioner, a washing machine, or the like, or in an automobile or the like to generate an air flow.

When the fan motor is installed in the home appliance such as the vacuum cleaner or the like, the fan motor may generate a suction force for sucking an air into a dust collecting portion.

When the fan motor is installed in the automobile, an external air may be supplied to an internal combustion engine such as an engine or the like.

An example of such fan motor may include a motor housing, a stator installed in the motor housing, a rotor rotated by the stator, a rotation shaft having the rotor equipped thereon, and an impeller installed on the rotation shaft.

When the rotation shaft rotates, the impeller rotates, so that the fan motor may suck the air.

The rotation shaft of the fan motor may be rotatably supported by at least one bearing and the rotation shaft may be rotated at a high speed while being supported by the bearing.

A performance of the fan motor may be lowered when a temperature inside the fan motor is increased. Thus, it is desirable that the temperature inside the fan motor is maintained such that the fan motor is not overheated.

When the fan motor is driven, the stator, the rotor, the bearing, and the like may be heated up. Such stator, rotor, bearing, and the like may be a major factor in raising the internal temperature of the fan motor.

It is preferable that the fan motor dissipates a heat such that the internal temperature thereof is not increased. To this end, the fan motor may directly flow the air blown by the impeller to the stator or to the rotor to cool the stator or the rotor in an air-cooling manner.

DISCLOSURE

Technical Purpose

A purpose of the present disclosure is to provide a fan motor in which an air flowed by an impeller may dissipate a heat of a stator rapidly without directly being in contact with the stator.

Technical Solution

An aspect of the present disclosure, there is provided a fan motor including: an inner housing having an inner space defined therein; a rotation shaft assembly having a rotor and a bearing mounted on a rotation shaft, wherein the rotation shaft is supported in the inner housing; a stator disposed to surround the rotor in the inner housing; an impeller connected to the rotation shaft; and an outer housing for surrounding an outer periphery of the inner housing and an outer periphery of the impeller, wherein the outer housing has an inlet body for guiding air to the impeller. Further, a heat dissipation vane for guiding air sucked into the inlet body and then passed between the inner housing and the outer housing is formed on an outer circumference face of the inner housing.

In one embodiment, the fan motor may further includes: an outer case having an outer space defined therein in which the outer housing is accommodated; and at least one PCB module disposed in the outer space to control the fan motor and in contact with an outer circumference face of the inlet body.

In one embodiment, a heat dissipation fin may protrude from an inner circumference face of the inlet body.

In one embodiment, the inlet body may be in a form of a hollow cylinder. Further, a heat dissipation fin may have a plurality of heat dissipation fins, wherein the plurality of heat dissipation fins may be spaced apart from each other in a circumferential direction along the inner circumference face of the inlet body. The heat dissipation fin may be elongated in a direction parallel to the rotation shaft.

In one embodiment, the PCB module may include: a PCB having a controlling part installed thereon; and a heating part installed on the PCB. The heating part may include a curved face. The curved face may surround the outer circumference face of the inlet body and may be in a face contact with the outer circumference face of the inlet body.

In one embodiment, the PCB module may include a pair of PCB modules, and the pair of PCB modules may be symmetrically arranged with the outer housing therebetween.

In one embodiment, the fan may further include: at least one outer cover for covering the outer space, wherein the outer cover may include: a first outer cover for shielding one of the PCB modules; and a second outer cover located on an opposite side of the first outer cover to shield the other of the PCB modules.

In one embodiment, the heat dissipation vane may include a plurality of heat dissipation vanes, wherein the plurality of heat dissipation vanes may be spaced apart from each other in a circumferential direction along the outer circumference face of the inner housing. Further, a height of each of the heat dissipation vanes may be smaller than a height of a gap between the inner housing and the outer housing.

In one embodiment, the heat dissipation vane may include: a curved portion having a curved shape; and a straight portion extending from the curved portion such that the straight portion is positioned behind the curved portion in a flow direction of air.

In one embodiment, the straight portion may be elongated in a direction parallel to the rotation shaft.

In one embodiment, the inner housing may include a first region facing the stator in a radial direction and a second region not facing the stator in the radial direction. The straight portion may protrude from an outer face of the first region.

In one embodiment, the inner housing may include: an inner body having an inner space defined therein and having the stator mounted on an inner periphery of the inner body; and an inner motor cover coupled to the inner body to cover the inner space, wherein the inner motor cover has a rotation shaft through-hole defined therein through which the rotation shaft passes.

In one embodiment, the heat dissipation vane may protrude from an outer circumference face of the inner body.

In one embodiment, the inner body may include: a hollow cylinder body having the heat dissipation vane protruding from an outer circumference face of the hollow cylinder body; and a bearing housing connected to the hollow cylinder body and supporting the bearing on an opposite side of the inner motor cover.

In one embodiment, the fan motor may further include a convergence outlet. The convergence outlet may be coupled to the outer housing. The convergence outlet may collect and discharge air passed between the inner housing and the outer housing.

In one embodiment, the convergence outlet may include: a large-diameter portion larger than the inner housing and connected to the outer housing; a small-diameter portion smaller than the large-diameter portion; and a connecting portion connecting the large-diameter portion and the small-diameter portion with each other.

In one embodiment, an inner diameter of the connection portion may be gradually reduced from the large-diameter portion to the small-diameter portion.

In one embodiment, an inner diameter of the large-diameter portion may be larger than an outer diameter of the inner housing. The large-diameter portion may surround a portion of the inner housing. An inner diameter of the small-diameter portion may be smaller than an inner diameter of the inner housing. Further, the small-diameter portion may protrude in a direction opposite to the inlet body.

In one embodiment, the convergence outlet may further include an outer housing coupling portion surrounding a portion of the outer housing and coupled with the outer housing.

In one embodiment, the inner housing may have a protruding fastening boss behind the heat dissipation vane in a flow direction of air. Each of the outer housing and the outer housing coupling portion may have a fastening hole defined therein. Further, the outer housing coupling portion and the outer housing may be fastened to the inner housing by the fastening member passing through the fastening holes to be fastened to the fastening boss.

Technical Effect

According to the embodiment of the present disclosure, the air flowed to the impeller may efficiently absorb the heat transferred from the stator to the heat dissipation vane while being guided to the heat dissipation vane. Further, the flow of the air may be stabilized than when the air collides with the stator and the rotor. Thus, the air may be rapidly discharged.

Further, the heat of the PCB module may be dissipated into the air sucked into the inlet body. Thus, the air may primarily dissipate the heat of the PCB module and then secondarily dissipate the heat of the stator. In addition, the heat of the PCB module and the heat of the stator may be dissipated together with the simple structure.

In addition, the heating part is in a face contact with the inlet body, so that the heat of the heating part may dissipated more rapidly.

Further, the air may dissipate the heat of the stator while passing around the curved portion and then passing around the straight portion. In addition, the beat of the stator may be rapidly dissipated through a large heat dissipation area.

Further, the straight portion may minimize a generation of a vortex of the air exhausted to the outside while rapidly dissipating the heat generated from the stator to the air.

Further, a flow velocity and a compression ratio of the air passed through the inner housing and the outer housing are increased. Thus, the air is discharged to the outside of the convergence outlet.

Further, the air may be rapidly compressed and discharged while minimizing a shift of the flow direction of the air.

Further, the number of the fastening members for fastening the convergence outlet, the outer housing, and the inner housing together may be minimized, and the number of components may be minimized.

DETAILED DESCRIPTIONS

Hereinafter, a specific embodiment of the present disclosure will be described in detail with reference to drawings.

Figure 1:
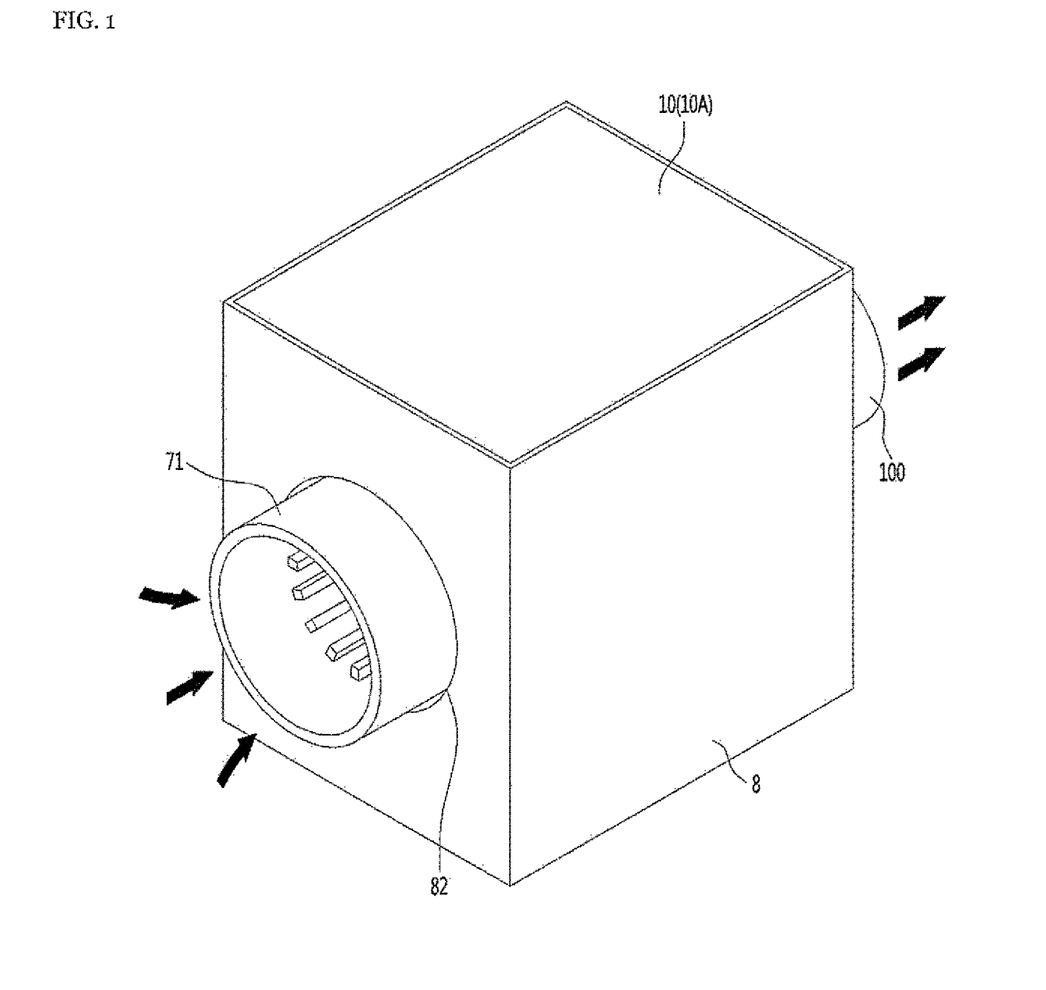
FIG. 1 is a perspective view of a fan motor according to an embodiment of the present disclosure.
Figure 2:
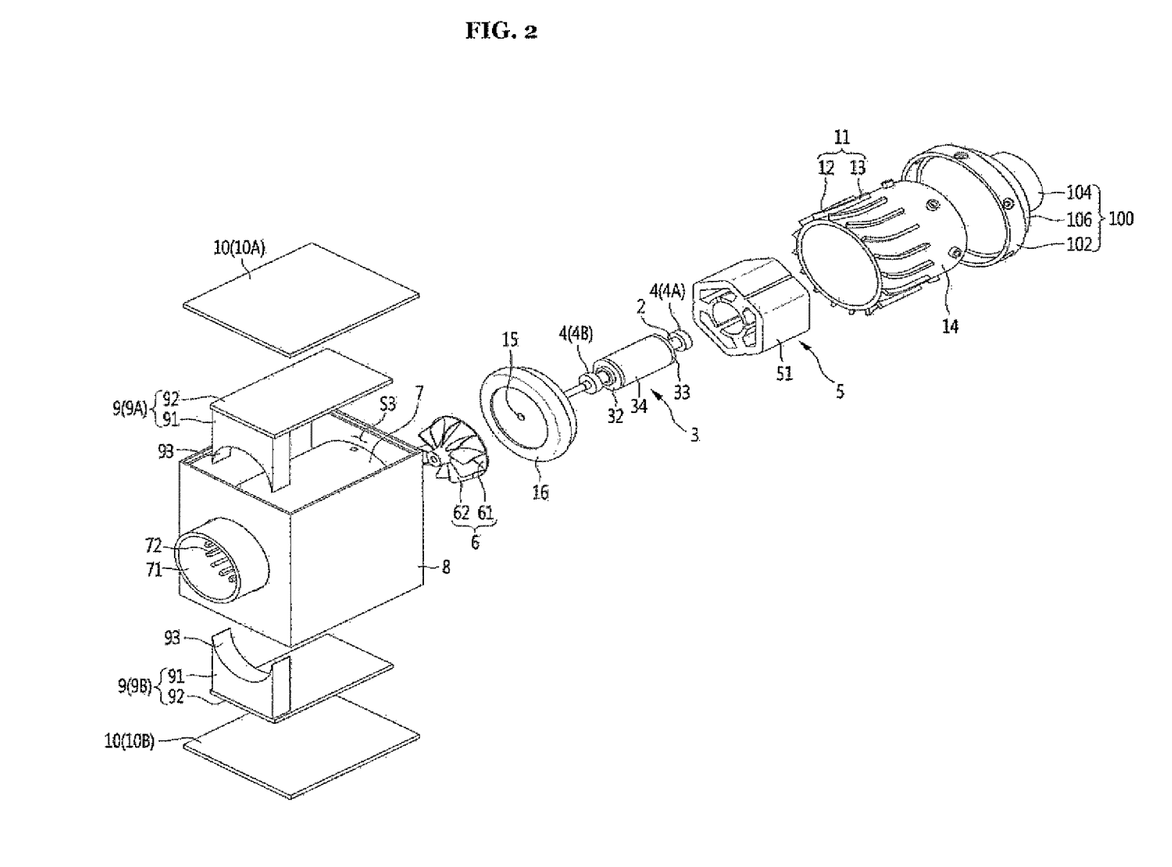
FIG. 2 is an exploded perspective view of a fan motor according to an embodiment of the present disclosure.
Figure 3:
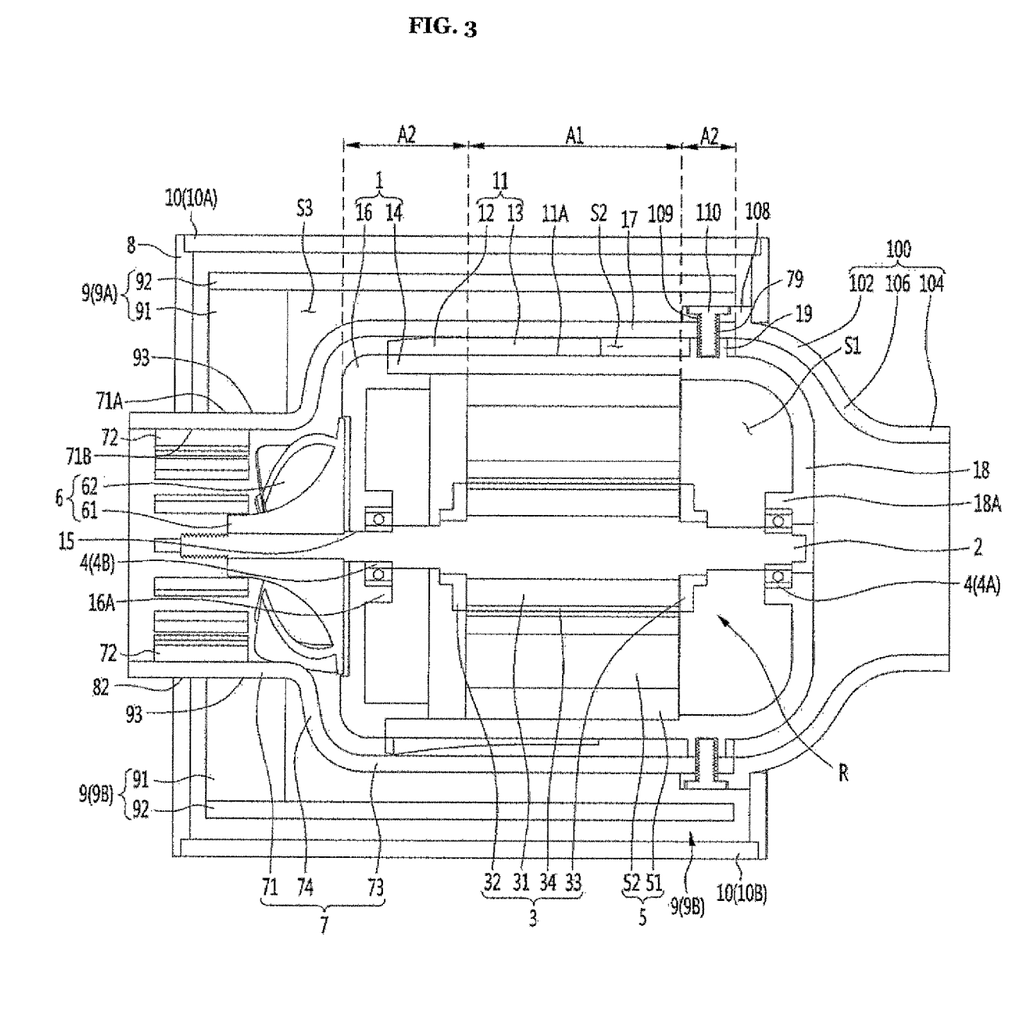
FIG. 3 is a cross-sectional view of a fan motor according to an embodiment of the present disclosure.
Figure 4:
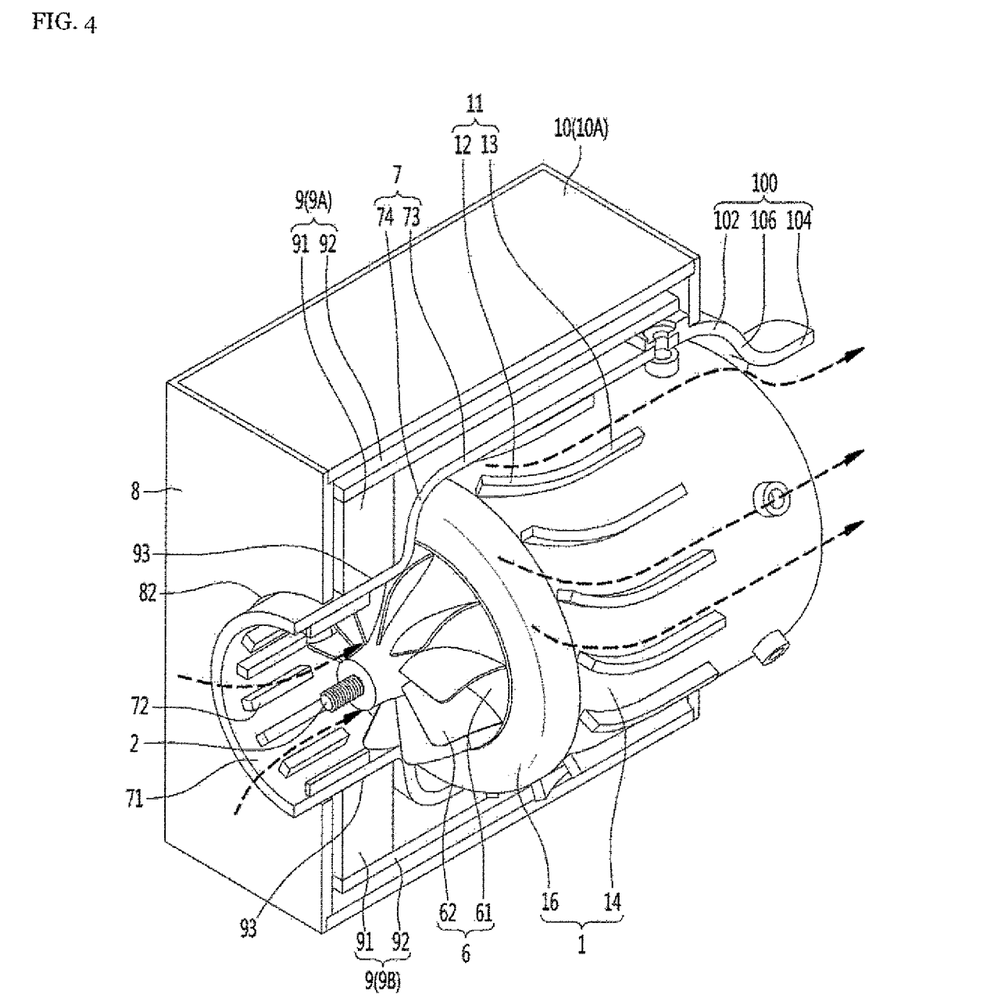
FIG. 4 is a partially cut perspective view illustrating an air flow inside a fan motor according to an embodiment of the present disclosure.

FIG. 1 is a perspective view of a fan motor according to an embodiment of the present disclosure. Further, FIG. 2 is an exploded perspective view of a fan motor according to an embodiment of the present disclosure. Further, FIG. 3 is a cross-sectional view of a fan motor according to an embodiment of the present disclosure. Further, FIG. 4 is a partially cut perspective view illustrating an air flow inside a fan motor according to an embodiment of the present disclosure.

A fan motor of present embodiment includes: an inner housing 1 having an inner space S1 defined therein; a rotation shaft assembly R having a rotor 3 and a bearing 4 mounted on a rotation shaft 2 and supported in the inner housing 1; a stator 5 disposed to surround the rotor 3 in the inner housing 1; an impeller 6 connected to the rotation shaft 2; and an outer housing 7 surrounding an outer periphery of the inner housing 1 and an outer periphery of the impeller 6.

The outer housing 7 may have an inlet body 71 for guiding an air to the impeller 6.

A heat dissipation vane 11 may be provided on an outer circumference face of the inner housing 1. The heat dissipation vane 11 may guide the air sucked into the inlet body 71 and passed through a gap S2 between the inner housing 1 and the outer housing 7. The heat dissipation vane 11 may dissipate a heat transferred from the stator 5 to the inner housing 1 into the air.

The heat dissipation vane 11 may function as a heat dissipation fin for widening a contact area between the air and the inner housing 1.

The air may flow through such heat dissipation vane 11 and absorb a heat of the heat dissipation vane 11 and a heat of the inner housing 1.

When the rotation shaft 2 rotates, the impeller 6 may be rotated within the outer housing 7.

Further, when the rotation shaft 2 rotates, the rotor 3, the bearing 4, and the stator 5 may respectively generate heats.

The heats respectively generated from the rotor 3, the bearing 4 and the stator 5 may be transferred to the inner housing 1 and the heat of the inner housing 1 may be transferred to the heat dissipation vane 11.

When the impeller 6 rotates, an air outside the fan motor may be sucked into the impeller 6 through the inlet body 71.

The impeller 6 may compress the air and blow the compressed air in a centrifugal direction of the impeller 6.

The air blown from the impeller 6 may pass through the gap S2 between an outer face of the inner housing 1 and an inner face of the outer housing 7. This air may be guided to the heat dissipation vane 11 while passing through the gap S2 between the outer face of the inner housing 1 and the inner face of the outer housing 7.

The air guided to the heat dissipation vane 11 may absorb the heat of the heat dissipation vane 11 while flowing along the heat dissipation vane 11.

The air guided to the heat dissipation vane 11 may be heated by the heat dissipation vane 11. Further, this air may pass the heat dissipation vane 11 and escape from the gap S2 between the outer face of the inner housing 1 and the inner face of the outer housing 7.

The fan motor of the present embodiment may absorb the heats of the rotor 3 and the stator 5 via the inner housing 1, in particular, the heat dissipation vane 11 without the air being in direct contact with the rotor 3 and the stator 5 and dissipate the heats of the rotor 3 and the stator 5.

The fan motor may include: an outer case 8 having an outer space S3 defined therein in which the outer housing 7 is accommodated; and at least one PCB module 9 disposed in the outer space S3 to control the fan motor and in contact with an outer circumference face 71A of the inlet body 71.

The at least one PCB module 9 may be in contact with the outer circumference face 71A of the inlet body 71.

The inlet body 71 may be in a form of a hollow cylinder.

A beat dissipation fin 72 may protrude from an inner circumference face 71B of the inlet body 71. A plurality of heat dissipation fins 72 may be spaced apart from each other in a circumferential direction along the inner circumference face of the inlet body 71. The heat dissipation fin 72 may be elongated in a direction parallel to the rotation shaft 1.

The inlet body 71 may include a contact region in contact with the PCB module 9 and a non-contact region not in contact with the PCB module 9. Further, the heat dissipation fin 72 may protrude from an inner circumference face of the contact region.

When the air passes through the inlet body 71, a portion of the air may be in contact with the heat dissipation fin 72, and the air in contact with the heat dissipation fin 72 may absorb a heat from the heat dissipation fin 72.

The air may pass between the plurality of heat dissipation fins 72, the air passing between the plurality of heat dissipation fins 72 may be in contact with the inner circumference face of the inlet body 71 and absorb the heat through the inner circumference face of the inlet body 71.

The PCB module 9 may include a heating part 91 in contact with the outer circumference face 71A of the inlet body 71 and a PCB 92 having the heating part 91 mounted thereon.

The heating part 91 may be a face contact portion at which the PCB module 9 is in face contact with the inlet body 71.

The heating part 91 may include a curved face 93 surrounding the outer circumference face 71A of the inlet body 71 and in face contact with the outer circumference face 71A of the inlet body 71.

The PCB 92 may have a controlling part for controlling the fan motor installed thereon, may be connected to the stator 6, and may control the stator 6.

The heating part 91 may be constituted by a heat transfer member for transferring a heat of the PCB 92 to the inlet body 71. In this case, the heating part 91 may be formed of a material having a high heat transfer performance, such as an aluminum.

A heat generated from the controlling part installed on the PCB 92 may be transferred to the heating part 91 through the PCB 92. Further, the heat transferred to the heating part 91 may be transferred to the heat dissipation fin 72 of the inlet body 71 through the inlet body 71. Further, the heat transmitted to the heat dissipation fin 72 as described above may be dissipated to the air passing through the inlet body 71.

In one example, the heating part 91 may be constituted by an electronic part having a circuit therein, such as an IGBT or the like. In this case, the heating part 91 may be constituted by a high-heating electronic part having a relatively high heat dissipation quantity among the controlling parts installed on the PCB 92.

An outer face of the heating part 91 may be the curved face 93. Further, a heat generated from such heating part 91 may be transferred to the heat dissipation fin 72 of the inlet body 71 through the inlet body 71. Further, the air passing through the inlet body 71 may dissipate the heat transferred to the heat dissipation fin 72 as described above to the heat dissipation fin 72.

In addition, the fan motor may further include at least one outer cover 10 for covering the outer space S3.

Hereinafter, each component of the present disclosure will be described in detail.

The inner housing 1 may include a first region A1 that faces the stator 6 in a radial direction and a second region A2 that does not face the stator 6 in the radial direction.

In the inner housing 1, the first region A1 may be defined between a pair of second regions A2.

The inner housing 1 may include an inner body 14 having an inner space S1 defined therein and having the stator 6 mounted on an inner periphery thereof.

The inner body 14 may include: a hollow cylinder body 17 having an inner space S1 defined therein and the heat dissipation vane 11 protruding from an outer circumference face thereof; and a bearing housing 18 connected to the hollow cylinder body 17 and supporting the bearing 4 on an opposite side of an inner motor cover 16.

The inner body 14 may be in a form of a container with an open face facing the impeller 6, and in a form in which an opposite side of the impeller 6 may be blocked by the bearing housing 18.

A plurality of heat dissipation vanes 11 may be spaced apart from each other in a circumferential direction along the outer circumference face 11A of the inner housing 1.

A height of the heat dissipation vane 11 may be smaller than a height of a gap G between the inner housing 1 and the outer housing 7.

The heat dissipation vane 11 may include: a curved portion 12 having a curved shape; and a straight portion 13 extending from the curved portion 12 such that the straight portion 13 is positioned behind the curved portion 12 in a flow direction of the air.

The straight portion 13 may be elongated in a direction parallel to the rotation shaft 1.

The straight portion 13 may protrude from an outer face of the first region A1. The first region A1 may be a region with the highest temperature in the inner housing 1 due to the heat of stator 5. The straight portion 13 may be elongated in the direction parallel to the rotation shaft 1 on the outer face of the first region A1 to rapidly dissipate a heat of the first region A1 into the air.

The straight portion 13 may guide the air in the direction parallel to the rotation shaft 2 direction and minimize a generation of a vortex of the air exhausted to an outside through the gap S2 between the inner housing 1 and the outer housing 7.

An outer circumference face of the inner body 14 may be the outer circumference face of the inner housing 1 and the heat dissipation vane 11 may protrude from the outer circumference face of the inner body 14. The heat dissipation vane 11 may protrude from an outer circumference face of the hollow cylinder body 17.

Further, the inner housing 1 may further include the inner motor cover 16 coupled to the inner body 14 to seal the inner space S1. The inner motor cover 16 may have a rotation shaft through-hole 15 defined therein through which the rotation shaft 2 passes.

The inner motor cover 16 may include an impeller facing face facing the impeller 6. The air blown by the impeller 6 may be guided to the inner motor cover 16 and guided to the heat dissipation vane 11.

The rotation shaft 2 may extend from an interior of the inner housing 1 to an interior of the inlet body 71. Most of the rotation shaft 2 may be located inside the inner housing 1 and a portion of the rotation shaft 2 to which the impeller 6 is connected may be located inside the inlet body 71.

The rotation shaft 2 may have an impeller connection portion at a portion of the rotation shaft 2 located outside the inner housing 1. Further, the rotation shaft 2 may have a bearing mounting portion at a portion of the rotation shaft 2 located inside the inner housing 1.

The rotor 3 may be mounted to surround a portion of the rotation shaft 2. The rotor 3 may be rotatably positioned inside the stator 6. The rotor 3 may be formed in a hollow cylindrical shape.

The rotor 3 may include an installed magnet 31 disposed to surround the rotation shaft 2 and a pair of end plates 32 and 33 for fixing the magnet 31. The rotor 3 may further include a sleeve 34 disposed to surround the magnet 31.

The rotor 3 may be mounted to surround a portion of the rotation between one end and the other end of the rotation shaft 2.

At least one bearing 4 may be fixed to the inner housing 1.

The fan motor may include a pair of bearings 4A and 4B. One of the pair of bearings 4A and 4B may be received and supported in a hollow portion 18A defined in the bearing housing 18. The other one of the pair of bearings 4A and 4B may be received and supported in a hollow portion 16A defined in the inner motor cover 16.

The stator 5 may be mounted on the inner circumference face of the inner housing 1. The stator 5 may be installed in the inner body 14, in particular, on the inner circumference face of the hollow cylinder body 17 to surround the rotor 3. The stator 5 may be mounted on the inner housing 1 with a fastening member such as a screw or the like. The stator 5 may be formed in a hollow cylindrical shape.

The stator 5 may be a composed of a combination of a plurality of members. The stator 5 may include a stator core 51 and a coil 52 mounted in the stator core 51.

The impeller 6 may be connected to the rotation shaft 2 such that the impeller 6 is located outside the inner housing 1.

The impeller 6 may be fixed to the rotation shaft 2 such that a portion of the impeller 6 is inserted into the inlet body 71. The impeller 6 may suck the air in an axial direction and blow the sucked air in the centrifugal direction. The impeller 6 may include: a hub 61 having one face facing the inner housing 1; and a plurality of blades 62 spirally formed along an outer circumference face of the hub 61.

The hub 61 may be formed such that an outer diameter thereof gradually increases as the outer diameter approaches the inner housing 1. The impeller 6 may include: an inlet facing the inner circumference face of the inlet body 71 in a radial direction; and an outlet facing the outer hollow portion 73 of the outer housing 7 in the radial direction.

The outer housing 7 may have a space therein in which the inner housing 1 is received. The outer housing 7 may include an outer hollow portion 73 defined therein larger than the inlet body 71 and the inner body 14. Further, the gap S2 through which the air passes may be defined between an inner circumference face of the outer hollow portion 73 and the outer circumference face of the inner housing 1.

The outer hollow portion 73 may be defined in a hollow cylindrical shape. An inner diameter of the outer hollow portion 73 may be larger than an inner diameter of the inlet body 71.

The outer housing 7 may include a connecting body 74 connecting the outer hollow portion 73 and the inlet body 71. The connecting body 74 may be in a shape of an annular plate.

The outer case 8 may be formed integrally with the outer housing 7. Alternatively, the outer case 8 may be separately formed from the outer housing 7 and then coupled to the outer housing 7.

When the outer case 8 is formed separately from the outer housing 7, a through-hole 82 through which the inlet body 71 is disposed may be defined in the outer case 8.

A portion of the outer housing 7 except for the inlet body 71 may be accommodated in the outer space S3. Further, the inlet body 71 may pass through the through-hole 82 from the outer space S3 to protrude outside the outer case 8.

The through-hole 82 may be defined larger than the inlet body 71. Further, a gap between the outer circumference face of the inlet body 71 and the through-hole 82 may be shielded by a peripheral portion of the inlet body 71 of the outer housing 7.

The outer case 8 may be composed of a single member, or may be composed of a combination of a plurality of members.

The outer case 8 may be formed of a box body having the outer space S3 defined therein. The outer case 8 may have an opening defined therein that is opened and closed by the outer cover 10.

The PCB module 9 may have a pair of PCB modules 9A and 9B symmetrically arranged with the outer housing 7 therebetween. The plurality of controlling parts controlling the fan motor may be distributed on the pair of the PCB modules 9. Further, the fan motor may become more compact than when one PC module 9 is accommodated in the outer case 8.

Each of the pair of PCB modules 9A and 9B may dissipate a heat through the inlet body 71 and the fan motor may dissipate the heat of the PCB module 9 more rapidly.

A heating part 91 of one 9A of the pair of PCB modules and a heating part 91 of the other one 9B of the pair of PCB modules 9B may surround the outer circumference face of the inlet body 91 in a divided manner. An opening in a cylindrical shape in which the inlet body 71 is received may be defined between the heating part 91 of one 9A of the pair of face modules and the heating part 91 of the other one 9B of the pair of PCB modules.

The outer cover 10 may include a single outer cover or a plurality of outer covers on the outer case 9.

The outer cover 10 may include: a first outer cover 10A for shielding one 9A of the PCB modules 9; and a second outer cover 10B located on an opposite side of the first outer cover 10A to shield the other 9B of the PCB modules 9.

When servicing one 9A of the PCB modules 9, a service provider may separate the first outer cover 10A from the outer case 9 to service said one 9A of the PCB modules 9. Further, when servicing the other 9B of the PCB modules 9, the service provider may separate the second outer cover 10B from the outer case 9 to service the other 9B of the PCB modules 9.

The fan motor may further include a convergence outlet 100 for guiding discharge of the air passed through the gap S2 between the inner housing 1 and the outer housing 7.

The convergence outlet 100 may include: a large-diameter portion 102 larger than the inner housing 1 and connected to the outer housing 7; a small-diameter portion 104 smaller than the large-diameter portion 102; and a connecting portion 106 connecting the large-diameter portion 102 and the small-diameter portion 104 with each other.

An inner diameter of the large-diameter portion 102 may be larger than an outer diameter of the inner housing 1. Further, the large-diameter portion 102 may surround a portion of the inner housing 1.

An inner diameter of the small-diameter portion 104 may be smaller than an inner diameter of the inner housing 1. The small-diameter portion 104 may protrude in a direction opposite to the inlet body 11.

An inner diameter of the connection portion 106 may be gradually reduced from the large-diameter portion 102 to the small-diameter portion 104.

The convergence outlet 100 may further include an outer housing coupling portion 108 surrounding a portion of the outer housing 7 and coupled with the outer housing.

In one example, the inner housing 1 may have a protruding fastening boss 19 behind the heat dissipation vane 11 in the flow direction of the air. Further, each of the outer housing 7 and the outer housing coupling portion 108 may have a fastening hole defined therein. The outer housing 7 may have an outer housing fastening hole 79 defined therein facing the fastening boss 19. Further, the outer housing coupling portion 108 may have a coupling portion fastening hole 109 facing the outer housing coupling hole 79.

In the fan motor, the convergence outlet 100, the outer housing 7, and the inner housing 1 may be fastened together by the fastening member 110. The outer housing coupling portion 108 and the outer housing 7 may be fastened to the inner housing 1 by the fastening member 110, such as a screw or the like, which passes through the fastening holes 109 and 70 to be fastened to the fastening boss 19.

Hereinafter, an operation of the present disclosure constructed as described above will be described.

First, the PCB module 9 may control the stator 5 and the rotation shaft 2 may rotate with the rotor 3. When the rotation shaft 2 rotates, the impeller 6 may be rotated and the outside air may be sucked into the inlet body 71.

The air sucked into the inlet body 71 may absorb the heat of the inlet body 71 and the heat of the heat dissipation fin 72 while passing through the inlet body 71.

The heating part 91 of the PCB module 9 may transfer the heat to the inlet body 71 and the heat dissipation fin 72 while being in face contact with the outer circumference face 71A of the inlet body 71. Further, the air passing through the inlet body 71 may primarily dissipate the heat of the PCB module 9.

The air that dissipated the heat of the PCB module 7 through the inlet body 71 and the heat dissipation fin 72 may be sucked into the impeller 6 and blown in the centrifugal direction of the impeller 6.

The air blown in the centrifugal direction of the impeller 6 may be blown between the inner motor cover 16 of the inner housing 1 and the connecting body 74 of the outer housing 7. Further, the air thus blown may pass through the gap between the outer face of the inner housing 1 and the inner face of the outer housing 7 and be be introduced between the outer hollow portion 73 and the inner body 14.

The air introduced between the outer hollow portion 73 and the inner body 14 may secondarily dissipate the heat of the stator 6 while being guided to the heat dissipation vane 11.

The air guided to the heat dissipation vane 11 may maintain a flow thereof in a spiral direction while being guided along the curved portion 12 and then guided to the straight portion 13. Then, the flow of the air may be changed in a direction parallel to the rotation shaft 2 along the straight portion 13.

The air guided to the straight portion 13 may absorb the heat of the straight portion 13 and the heat of the inner body 14 and may rapidly absorb the heat of the stator 5 through the straight portion 13 close to the stator 5.

The air guided to the straight portion 13 may be advanced in the axial direction parallel to the rotation shaft 2 and may be escaped from between the inner body 14 and the outer hollow portion 73 to enter between the convergence outlet 100 and the inner body 14.

A flow velocity of the air entered between the convergence outlet 100 and the inner body 14 may be accelerated while the air is passing through the large-diameter portion 102, the connecting portion 106, and the small-diameter portion 104 sequentially. Finally, the air may pass through the small-diameter portion 104 and exhausted to the outside.

Figure 5:
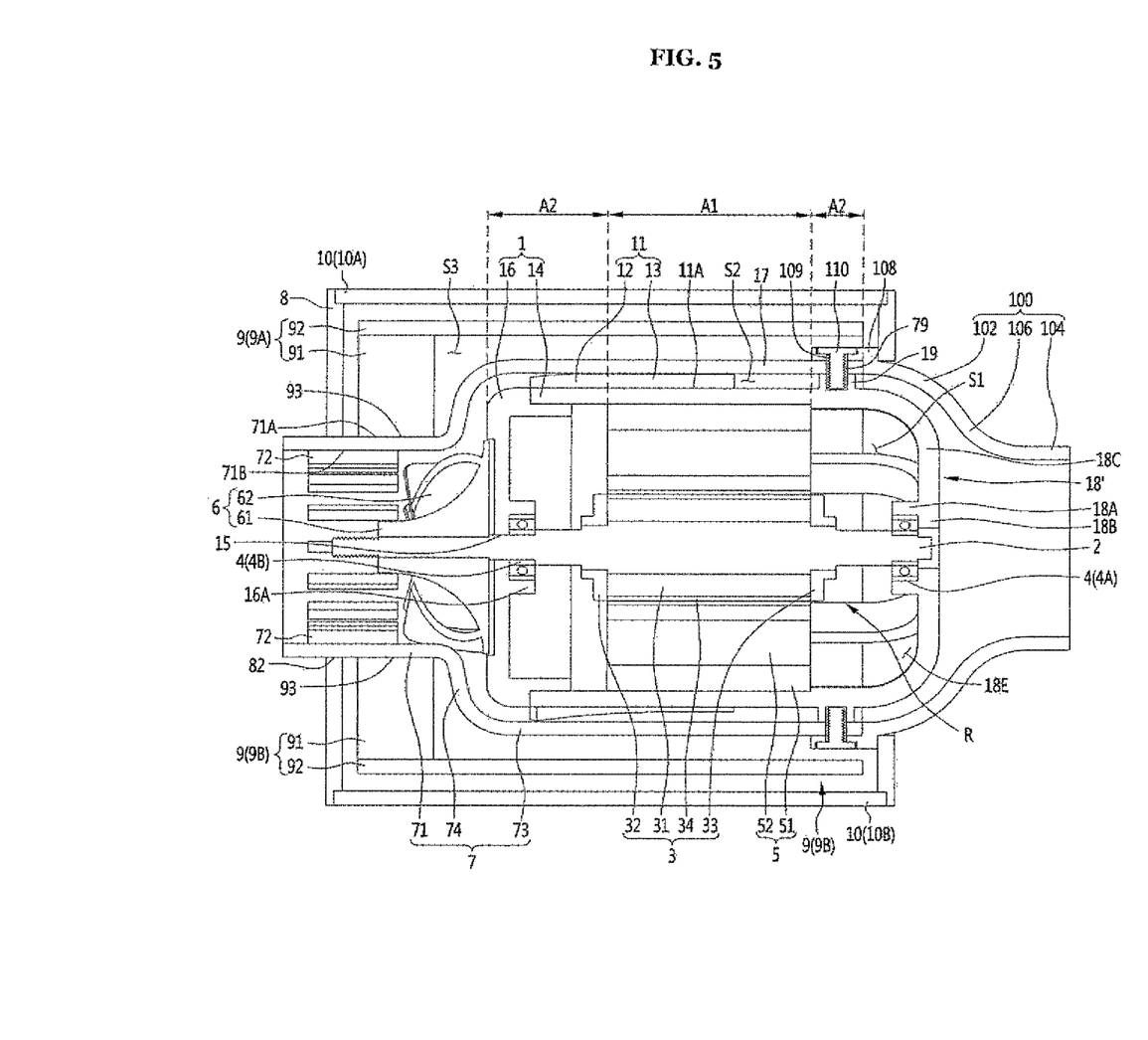
FIG. 5 is a cross-sectional view of a fan motor according to another embodiment of the present disclosure.
Figure 6:
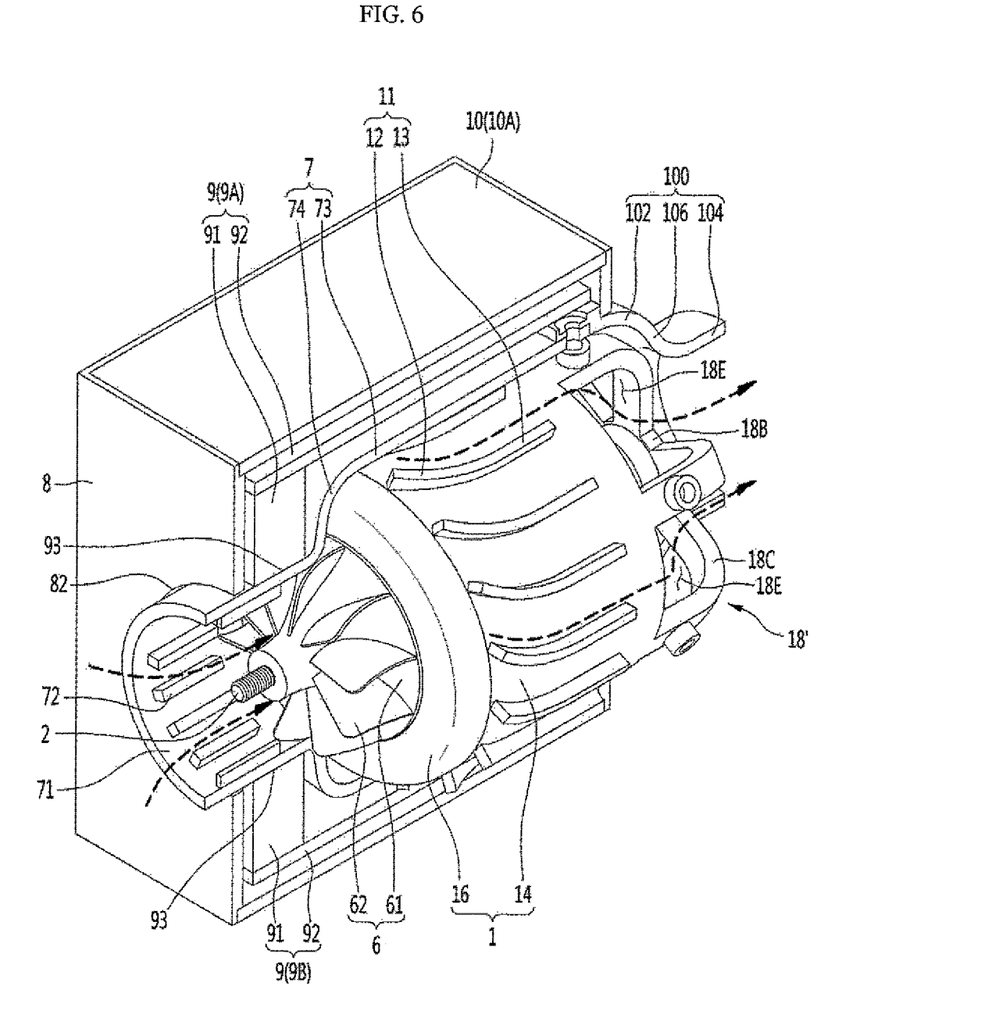
FIG. 6 is a partially cut perspective view illustrating an air flow inside a fan motor according to another embodiment of the present disclosure.

FIG. 5 is a cross-sectional view of a fan motor according to another embodiment of the present disclosure. Further, FIG. 6 is a partially cut perspective view illustrating an air flow inside a fan motor according to another embodiment of the present disclosure.

In the present embodiment, a through-hole 18E through which the air may flow may be defined in a bearing housing 18'. Other components and operations other than the bearing housing 18' are the same as or similar to the embodiment of the present disclosure, so that the same reference numerals are used and a detailed description thereof will be omitted.

The bearing housing 18' may include: the protruding hollow portion 18A for supporting the bearing 4; a covering portion 18B facing the rotor 3; and a plurality of supporting legs 18C for connecting an outer periphery of the cover portion 18A and the hollow cylinder body 17. Further, the through-hole 18E through which the air may pass may be defined between the plurality of supporting legs 18C.

After the air is guided to the heat dissipation vane 71 and then passed through the gap S2 between the inner housing 1 and the outer housing 7, a portion of the air may be introduced to a periphery of the bearing through the through-hole 18E and may absorb a heat of the hollow portion 18A that supports the bearing 4. The air that absorbed the heat at the periphery of the bearing 4 may be exhausted to the outside of the inner housing 1 through the through-hole 18E, and may be passed through the interior of the convergence outlet 100 and then exhausted to the outside.

In one example, heats emitted from the stator 6 and the rotor 3 in a direction of the bearing housing 18' may be absorbed into the air introduced through the hole 18E. Further, the air introduced into the through-hole 18E may absorb the heats of the stator 6 and the rotor 3 without being in a direct contact with the stator 6 and the rotor 3 and then exhausted to the outside.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments.

The scope of the present disclosure should be construed as being covered by the scope of the appended claims, and all technical ideas falling within the scope of the claims should be construed as being included in the scope of the present disclosure.

The invention claimed is:

1. A fan motor, comprising:
   an inner housing having an inner space defined therein;
   a rotational shaft assembly having a rotor and a bearing mounted on a rotational shaft, wherein the rotational shaft is supported in the inner housing;
   a stator disposed to surround the rotor in the inner housing;
   an impeller connected to the rotational shaft;
   an outer housing that surrounds an outer periphery of the inner housing and an outer periphery of the impeller, wherein the outer housing has an inlet body that guides air to the impeller, wherein at least one heat dissipation vane that guides air sucked into the inlet body and then passed between the inner housing and the outer housing is formed on an outer circumferential face of the inner housing;
   an outer case having an outer space defined therein in which the outer housing is accommodated; and
   at least one printed circuit board (PCB) module disposed in the outer space to control the fan motor and in contact with an outer circumferential face of the inlet body.

2. The fan motor of claim 1, wherein at least one heat dissipation fin protrudes from an inner circumferential face of the inlet body.

3. The fan motor of claim 2, wherein the inlet body is in a form of a hollow cylinder, wherein the at least one heat dissipation fin comprises a plurality of heat dissipation fins, and wherein the plurality of heat dissipation fins is spaced apart from each other in a circumferential direction along the inner circumferential face of the inlet body.

4. The fan motor of claim 2, wherein the at least one heat dissipation fin is elongated in a direction parallel to the rotational shaft.

5. The fan motor of claim 1, wherein the PCB module includes:
   a PCB having a controller installed thereon; and
   a heater installed on the PCB, wherein the heater includes a curved face that surrounds the outer circumferential face of the inlet body and in a face contact with the outer circumferential face of the inlet body.

6. The fan motor of claim 1, wherein the at least one PCB module includes a pair of PCB modules, and wherein the pair of PCB modules is symmetrically arranged with the outer housing therebetween.

7. The fan motor of claim 6, further comprising:
   at least one outer cover that covers the outer space, wherein the outer cover includes:
      a first outer cover that shields one of the pair of PCB modules; and
      a second outer cover located on an opposite side of the first outer cover to shield the other of the pair of PCB modules.

8. The fan motor of claim 1, wherein the at least one heat dissipation vane includes a plurality of heat dissipation vanes, wherein the plurality of heat dissipation vanes is spaced apart from each other in a circumferential direction along the outer circumferential face of the inner housing, and wherein a height of each of the plurality of heat dissipation vanes is smaller than a height of a gap between the inner housing and the outer housing.

9. The fan motor of claim 1, wherein the at least one heat dissipation vane includes:
   a curved portion having a curved shape; and
   a straight portion that extends from the curved portion such that the straight portion is positioned behind the curved portion in a flow direction of air.

10. The fan motor of claim 9, wherein the straight portion is elongated in a direction parallel to the rotational shaft.

11. The fan motor of claim 9, wherein the inner housing includes a first region that faces the stator in a radial direction and a second region that does not face the stator in the radial direction, and wherein the straight portion protrudes from an outer face of the first region.

12. The fan motor of claim 1, wherein the inner housing includes:
   an inner body having an inner space defined therein and having the stator mounted on an inner periphery of the inner body; and
   an inner motor cover coupled to the inner body to cover the inner space, wherein the inner motor cover has a rotational shaft through-hole defined therein through which the rotational shaft passes, and wherein the at least one heat dissipation vane protrudes from an outer circumference face of the inner body.

13. The fan motor of claim 12, wherein the inner body includes:
   a hollow cylinder body having the at least one heat dissipation vane protruding from an outer circumferential face of the hollow cylinder body; and
   a bearing housing connected to the hollow cylinder body and that supports the bearing on an opposite side of the inner motor cover.

14. The fan motor of claim 1, further comprising:
   a convergence outlet coupled to the outer housing, wherein the convergence outlet collects and discharges air passed between the inner housing and the outer housing.

15. The fan motor of claim 14, wherein the convergence outlet includes:
   a large-diameter portion larger than the inner housing and connected to the outer housing;
   a small-diameter portion smaller than the large-diameter portion; and
   a connecting portion that connects the large-diameter portion and the small-diameter portion with each other.

16. The fan motor of claim 15, wherein an inner diameter of the connection portion is gradually reduced from the large-diameter portion to the small-diameter portion.

17. The fan motor of claim 15, wherein an inner diameter of the large-diameter portion is larger than an outer diameter of the inner housing, wherein the large-diameter portion surrounds a portion of the inner housing, wherein an inner diameter of the small-diameter portion is smaller than an inner diameter of the inner housing, and wherein the small-diameter portion protrudes in a direction opposite to the inlet body.

18. The fan motor of claim 15, wherein the convergence outlet further includes an outer housing coupling portion that surrounds a portion of the outer housing and coupled with the outer housing.

19. A fan motor, comprising:
an inner housing having an inner space defined therein;
a rotational shaft assembly having a rotor and a bearing mounted on a rotational shaft, wherein the rotational shaft is supported in the inner housing;
a stator disposed to surround the rotor in the inner housing;
an impeller connected to the rotational shaft;
an outer housing that surrounds an outer periphery of the inner housing and an outer periphery of the impeller, wherein the outer housing has an inlet body that guides air to the impeller, wherein at least one heat dissipation vane that guides air sucked into the inlet body and then passed between the inner housing and the outer housing is formed on an outer circumferential face of the inner housing; and
a convergence outlet coupled to the outer housing, wherein the convergence outlet collects and discharges air passed between the inner housing and the outer housing, and wherein the convergence outlet includes:
a large-diameter portion larger than the inner housing and connected to the outer housing;
a small-diameter portion smaller than the large-diameter portion;
a connecting portion that connects the large-diameter portion and the small-diameter portion with each other; and
an outer housing coupling portion that surrounds a portion of the outer housing and coupled with the outer housing, wherein the inner housing has a protruding fastening boss behind the at least one heat dissipation vane in a flow direction of air, wherein each of the outer housing and the outer housing coupling portion has a fastening hole defined therein, and wherein the outer housing coupling portion and the outer housing are fastened to the inner housing by the fastening member passing through the fastening holes to be fastened to the fastening boss.

* * * * *